Figure 8:
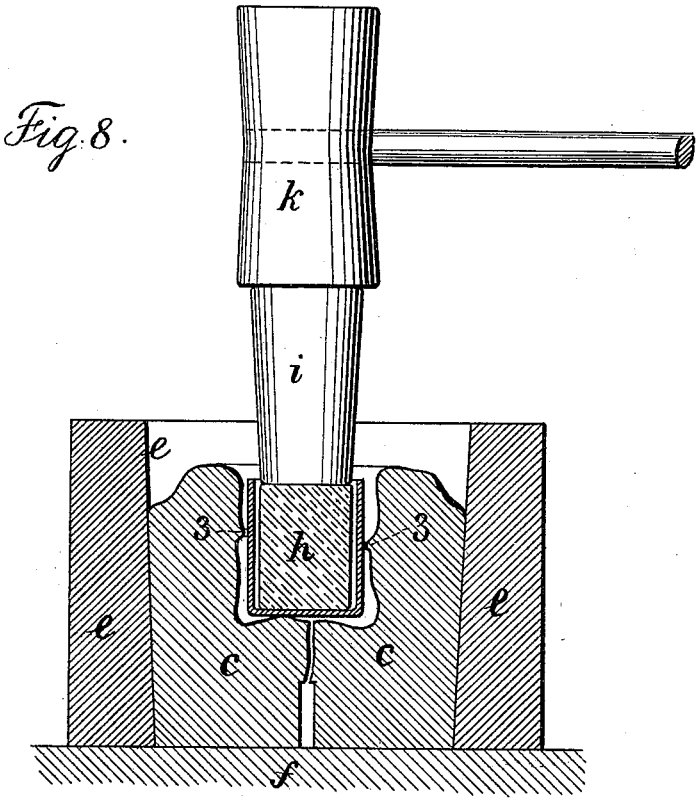

No. 622,068. Patented Mar. 28, 1899.
C. S. PAYNE.
MOLD FOR AND METHOD OF MAKING TOOTH CROWNS.
(Application filed Nov. 14, 1898.)
(No Model.) 2 Sheets—Sheet 1.
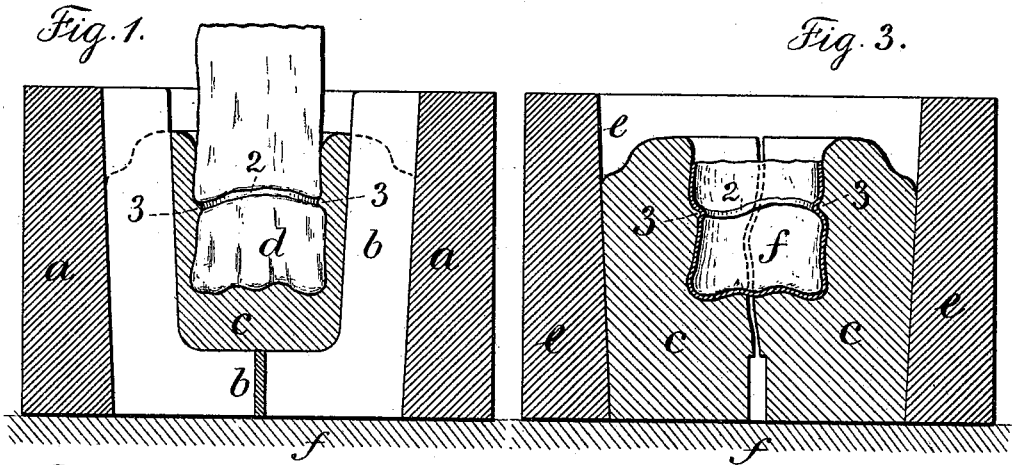
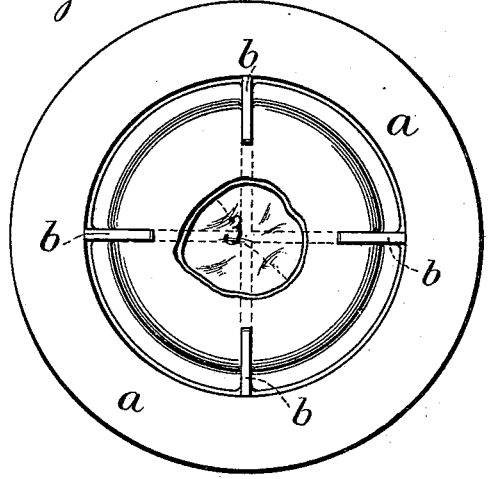
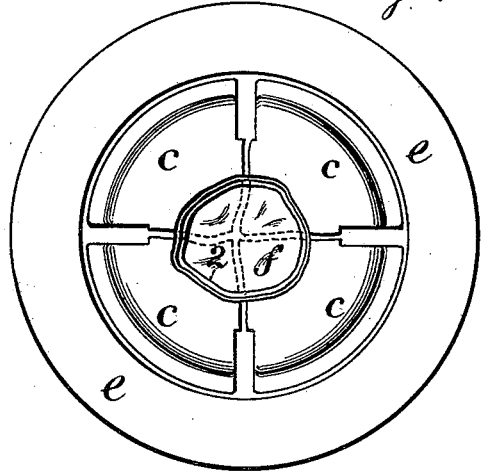
 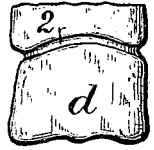 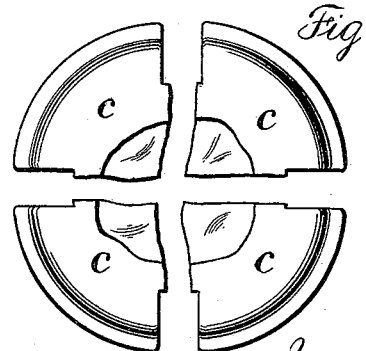
Witnesses:
J. Staib
Chas H Smith
Inventor:
Clyde S. Payne
per L. W. Serrell & Son
Attys.
THE NORRIS PETERS CO., PHOTO-LITHO., WASHINGTON, D. C.

No. 622,068. Patented Mar. 28, 1899.
C. S. PAYNE.
MOLD FOR AND METHOD OF MAKING TOOTH CROWNS.
(Application filed Nov. 14, 1898.)
(No Model.) 2 Sheets—Sheet 2.

Witnesses:
J. Staib
Chas. H. Smith

Inventor:
Clyde S. Payne
per L. W. Serrell & Son
Attys.

UNITED STATES PATENT OFFICE.

CLYDE S. PAYNE, OF NEW YORK, N. Y., ASSIGNOR TO CHARLOTTE E. PAYNE, OF SAME PLACE.

MOLD FOR AND METHOD OF MAKING TOOTH-CROWNS.

SPECIFICATION forming part of Letters Patent No. 622,068, dated March 28, 1899.

Application filed November 14, 1898. Serial No. 696,388. (No model.)

*To all whom it may concern:*

Be it known that I, CLYDE S. PAYNE, a citizen of the United States, residing at New York, in the county and State of New York, have invented a new and useful Improvement in Molds for and the Method of Making Tooth-Crowns, of which the following is a specification.

My invention relates to novel devices and the method employed in connection therewith for shaping blanks and making seamless metallic tooth-crowns, and in carrying out my invention I employ a cylindrical mold in which are placed intersecting plates. The metal forming the matrix is cast into this mold and upon the intersecting plates, and the tooth form or die is placed in the center of the mold and plates either before the metal is cast or the same is pressed into the metal while it is still in a molten condition. The inner surface of the cylindrical mold and the outer edges of the intersecting plates are slightly inclined or tapering, so that after the metal forming the matrix is set it can be removed from the mold and the intersecting plates are taken away from the matrix, so that the matrix is left with edge and base grooves. A suitable tool is introduced into these grooves, and the matrix is split up into sections, and the tooth form or die is removed. A cylindrical holder is provided for the divided matrix, the inner surface of which is also slightly tapering to conform to the surface of the matrix, and the diameter of the holder is slightly in excess of the diameter of the cylindrical mold in which the matrix was cast, the difference in diameter being equivalent to the thickness of the metal of the seamless metallic tooth-crown. The tooth-crown blank is placed in the matrix and the matrix is placed in the cylindrical holder and upon a suitable support, and thereafter the tooth-crown blank is swaged outwardly against the walls of the matrix until the same fills and fits closely within the cavity in the matrix and conforms to the surface configuration thereof and agrees with the outline of the tooth form or die, so that the tooth-crown will fit the tooth-stump and fill the office of a complete tooth. This swaging operation is preferably effected by filling the tooth-crown blank with such suitable material as a block of rubber, small metallic balls, shot, or metal filings and by using a plunger or rammer upon the same and giving the blows with a mallet or similar tool. I prefer in connection with these means and this method to form a groove around the tooth form or die, which groove indicates the outline or configuration of the surface of the gum around the tooth-stump upon which the crown is to be placed. This groove forms a rib around the surface of the matrix, and in the swaging of the tooth-crown blank the form of the rib of the matrix produces a groove in the tooth-crown, indicating the line upon which the same is to be trimmed, so as to fit the gum when the crown is in place.

In the drawings, Figure 1 is a vertical cross-section through the cylindrical mold and matrix and an elevation of the tooth form or die and part of the intersecting plates. Fig. 2 is a plan. Fig. 3 is a vertical cross-section of the cylindrical holder, the divided matrix, and the seamless metallic tooth-crown after the swaging operation. Fig. 4 is a plan of the same. Fig. 5 is a plan of the parts of the matrix separated. Fig. 6 is a plan of the tooth-crown alone. Fig. 7 is an elevation of the same ready for trimming; and Fig. 8 is a vertical section through the mold, matrix, tooth-crown, blank, and rubber block and an elevation of the rammer and mallet.

The cylindrical mold $a$ has an inner slightly-tapering surface, and $b$ represents the crossing or intersecting plates. These are in the form of an X, which is across the lower end of the mold, with rising arms that extend to the upper edge of the mold. These parts are placed upon a suitable bed or support $f$, and the molten metal forming the matrix $c$ is cast into this mold and between the plates. The tooth form or die $d$ is made in any suitable or desired manner well known in the dental art, the same conforming to the size and configuration of a complete tooth a reproduction of which in metal is desired. This reproduction in metal is the tooth-crown, and when the stump is capped therewith the same takes the place of an original natural tooth. A cavity corresponding to this tooth form or die is made in the center of the metal forming the matrix either by holding the tooth form or die in place and casting the metal around it or by forcing the die down into the metal while in a molten condition. After the metal is cooled it and the intersecting plates b and the tooth-form d are removed from the cylindrical mold and the intersecting plates are readily separated from the matrix, and when so separated the matrix has crossing grooves at the bottom and vertical grooves at the sides. The matrix thus scored is broken apart into sections by any suitable tool, or, in other words, the walls between the grooves and the open center are broken through to divide up the matrix and allow the tooth-form to be removed. A cylindrical holder e now receives the divided matrix, and the diameter of this cylindrical holder is slightly greater than that of the cylindrical mold a—that is, it is approximately as much larger as the thickness of the metal forming the tooth-crown f, and to show this plainly the drawing has been slightly exaggerated.

The blank forming the seamless metallic tooth-crown f is placed in the open center of the matrix and the matrix is placed in the cylindrical holder e, and in the operation of forming the tooth-crown the blank is filled partially or wholly with such suitable material as a soft-rubber block h or small metallic balls, shot, or metal fillings, and a rammer i and mallet k are employed to cause the blank to spread outwardly and fill the inequalities of the matrix c and conform to the configuration of the tooth form or die d. The excess of diameter of the cylindrical holder and the consequent spread and separation of the sections forming the matrix cause the tooth-crown when made to have an internal diameter conforming to the exterior diameter of the tooth form or die d and also a surface configuration conforming thereto. The spaces between the parts of the matrix are so slight that no impression is made on the tooth-crown in the swaging operation, it being found in practice that the swaging adjacent to any crack or division has a tendency to bring two parts of the matrix momentarily together.

The tooth form or die d is preferably made with a groove 2 of irregular outline in any manner well known in the dental art and conforming to the gum-line around the tooth, and of course when a tooth form or die with this groove is placed in the molten metal the cast matrix is made with a rib that conforms to the said groove, and this rib is shown at 3. Consequently when the seamless metallic blank forming the tooth-crown is swaged or expanded to fill the cavity in the matrix the same has a groove 2, which indicates the place where the tooth-crown shall be cut, so as to cause the crown to fit around the tooth-base upon which the crown is placed.

I claim as my invention—

1. In the manufacture of seamless metallic tooth-crowns, a cylindrical mold and intersecting plates within the same into which mold the metal forming the matrix is cast around the tooth form or die, a cylindrical holder for receiving the divided matrix and means for swaging the tooth-crown blank in the cavity of the matrix to cause it to conform to the surface configuration thereof, substantially as set forth.

2. In the manufacture of seamless metallic tooth-crowns a mold with an inner surface tapering slightly and intersecting plates within the same and conforming thereto, and into which mold the metal forming the matrix is cast around the tooth form or die, a holder for receiving the divided matrix also with an inner surface slightly tapering and slightly larger than the mold and means for swaging the tooth-crown blank in the cavity of the matrix to cause it to conform to the surface configuration thereof, substantially as set forth.

3. In the manufacture of tooth-crowns, the method herein specified of making the same, consisting in casting metal forming a matrix around a tooth form or die and into a mold containing intersecting plates, removing the tooth form or die, the intersecting plates and the matrix when cold from the mold, separating the plates from the matrix, and leaving grooves in the base and surface of the matrix, breaking up the matrix upon lines predetermined by the grooves, placing the divided matrix into a holder of slightly-greater diameter than the first mold in which the matrix was cast, placing the tooth-crown blank in the cavity of the matrix and swaging or enlarging the same outward to cause it to conform to the surfaces of the matrix-cavity, substantially as set forth.

4. In the manufacture of tooth-crowns, the method herein specified of forming the same, consisting in making a tooth form or die with a circumferential groove indicating the gum-line of the tooth, casting a matrix around the form in a mold having intersecting plates, removing the tooth form or die, the intersecting plates and the matrix when cold from the mold, separating the plates from the matrix so as to leave grooves in the base and sides of the matrix, breaking up the matrix upon the lines predetermined by the grooves to remove the tooth-form and expose the internal rib therein, placing the divided matrix into a holder of slightly-greater diameter than the mold in which the matrix was cast, placing the hollow tooth-crown blank in the cavity of the matrix and swaging or enlarging the same outward to cause it to conform to the surfaces of the matrix-cavity, whereby the seamless metallic tooth-crown when swaged has a groove to indicate the line which the tooth-crown is to be trimmed to cause it to conform to the gums, substantially as set forth.

Signed by me this 9th day of November, 1898.

CLYDE S. PAYNE.

Witnesses:
GEO. T. PINCKNEY,
HAROLD SERRELL.